Fig. 6.
Plate 1
 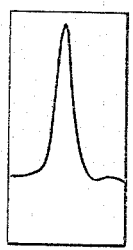 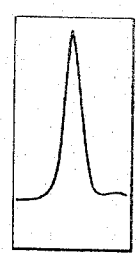 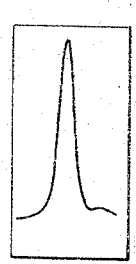
TIME: 94 MIN.  BAR ANGLE 50°  |  86 MIN. 50°  |  78 MIN. 50°  |  62 MIN. 53°
Plate 2
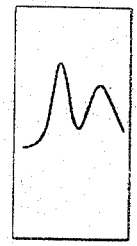   
TIME: 78 MIN.  BAR ANGLE 50°  |  62 MIN. 50°  |  46 MIN. 55°  |  38 MIN. 55°
Plate 3
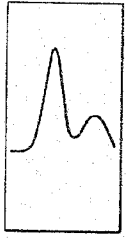   
TIME: 78 MIN.  BAR ANGLE 50°  |  70 MIN. 50°  |  62 MIN. 50°  |  54 MIN. 50°
Plate 4
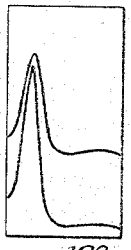   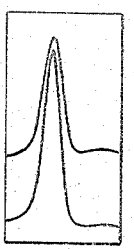
TIME: 129 MIN.  BAR ANGLE 55°  |  121 MIN. 55°  |  113 MIN. 55°  |  97 MIN. 55°
← DIRECTION OF SEDIMENTATION
INVENTOR.
MARK F. ADAMS.

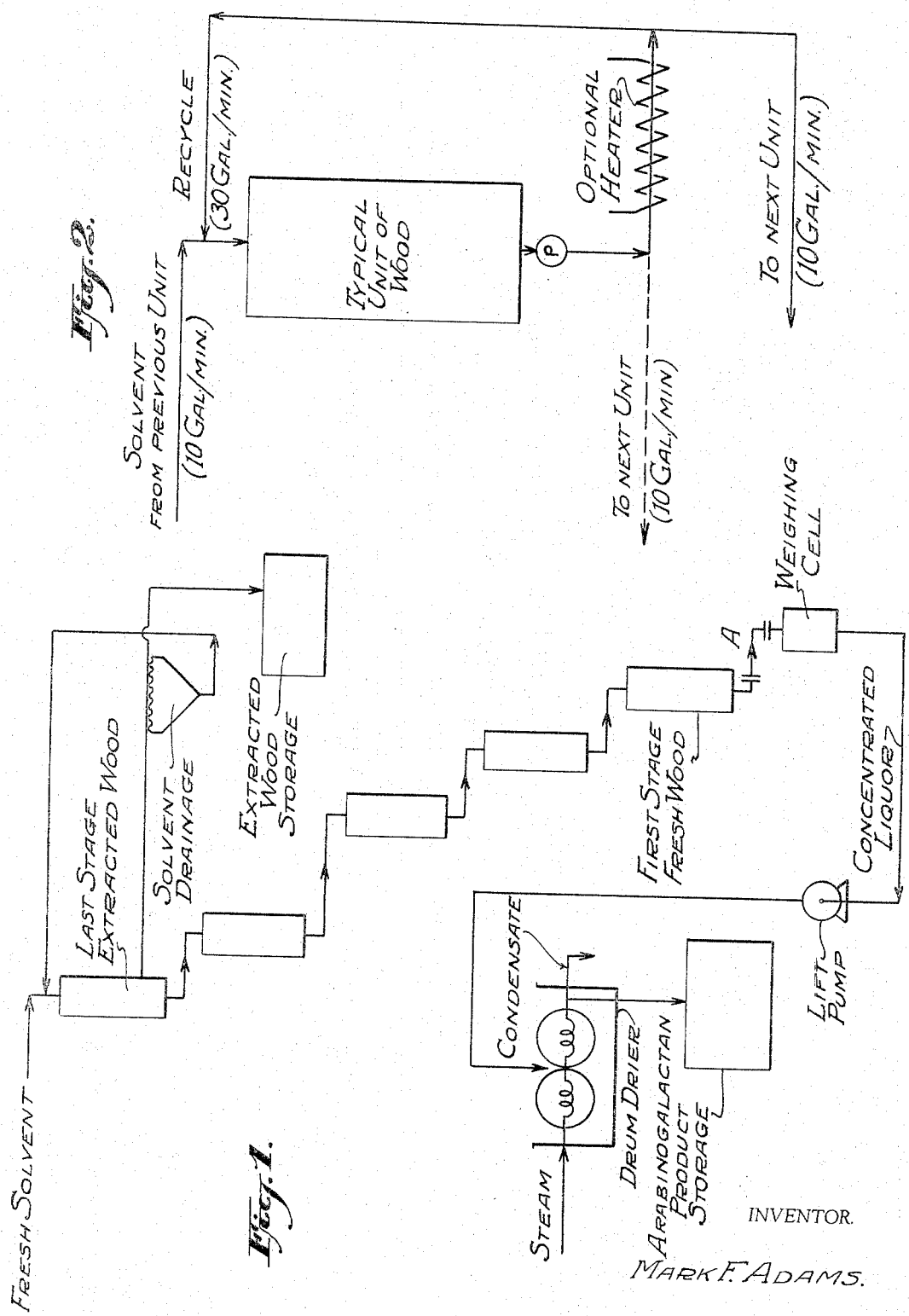

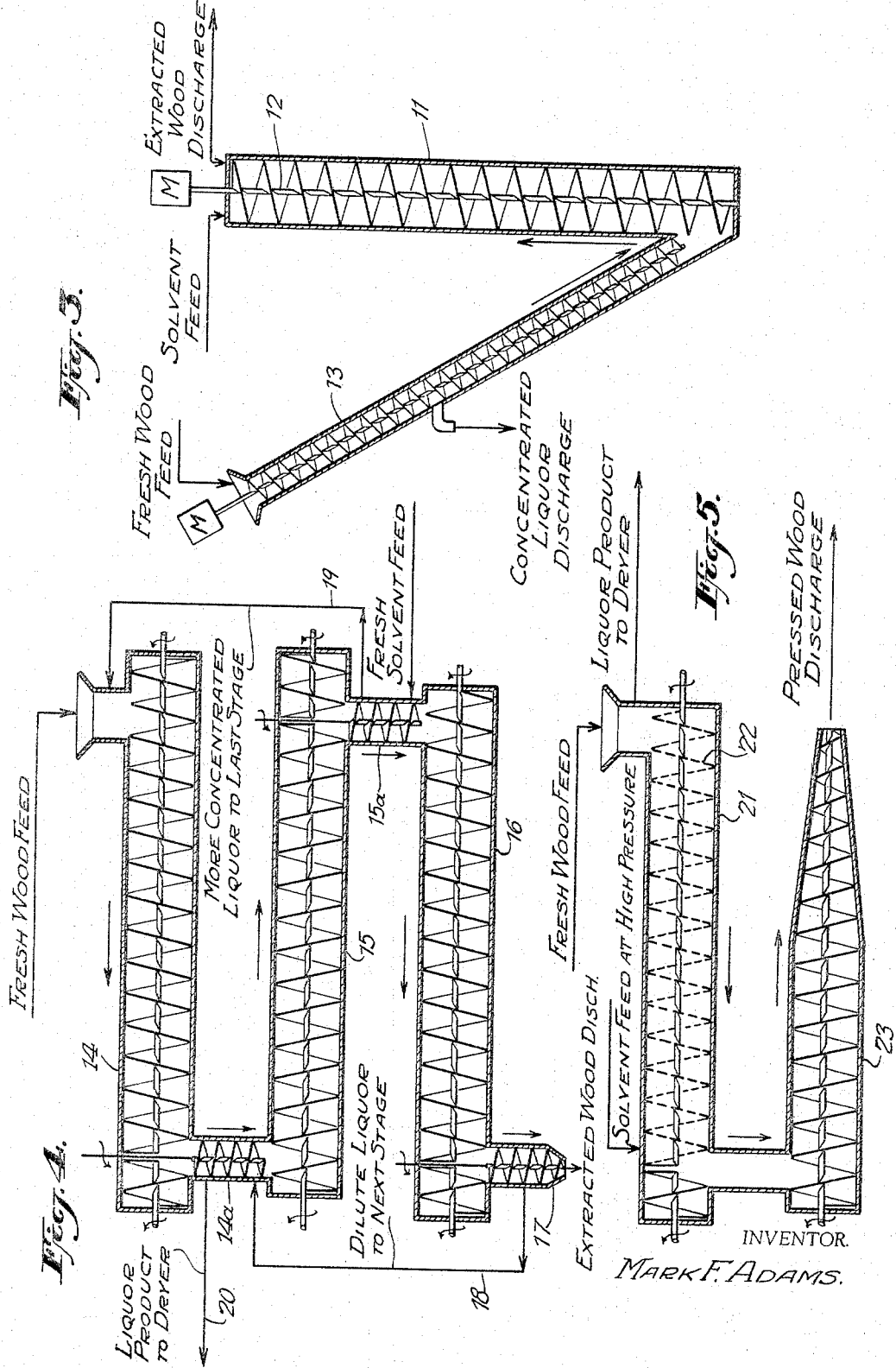

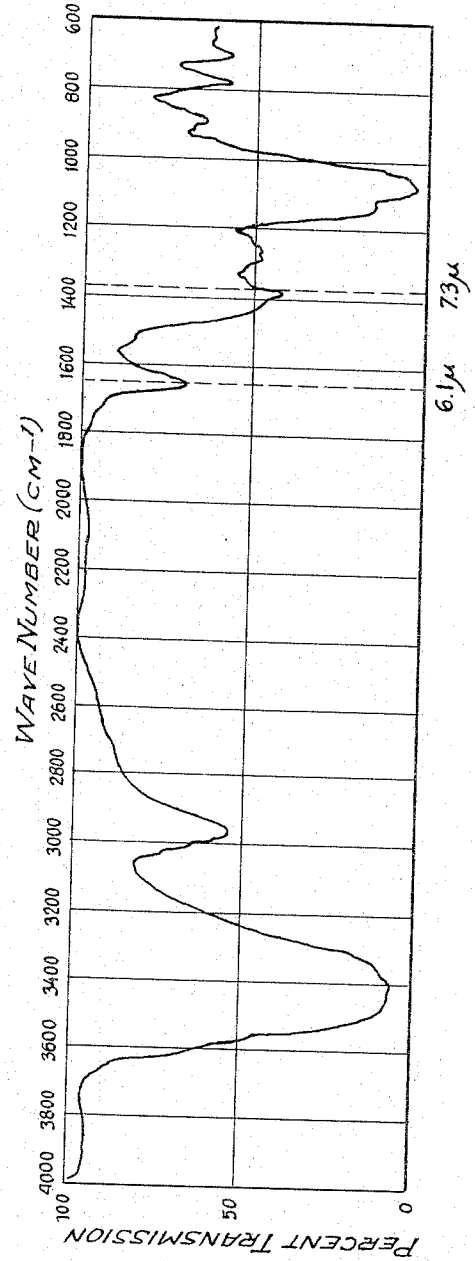

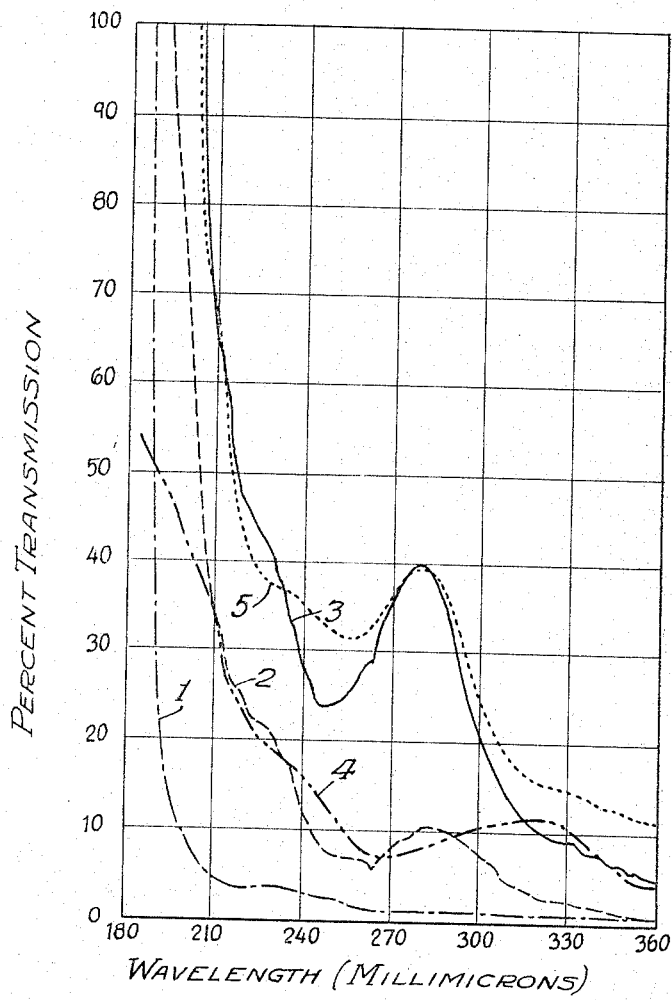

Aug. 22, 1967       M. F. ADAMS       3,337,526
PROCESS FOR PREPARING ARABINOGALACTAN
Filed Oct. 15, 1965                    6 Sheets-Sheet 6
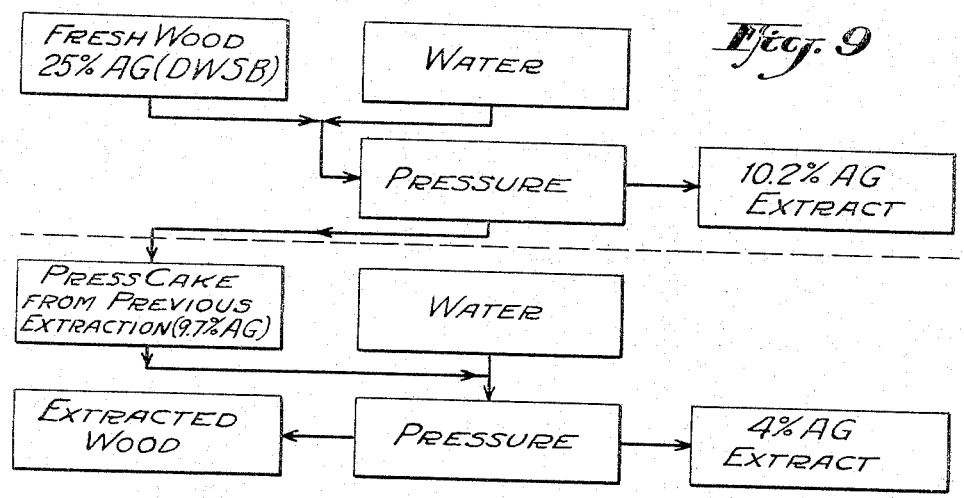
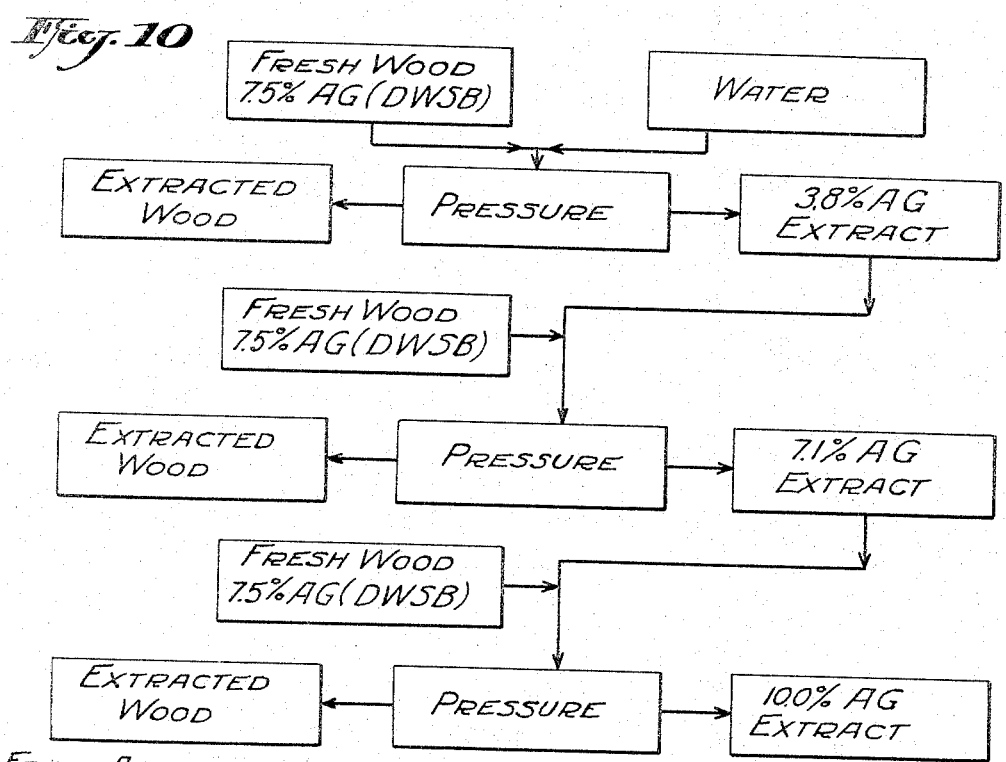
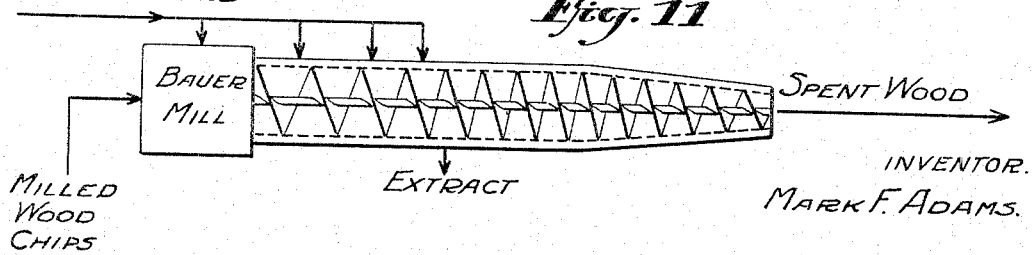
INVENTOR.
Mark F. Adams.

3,337,526
PROCESS FOR PREPARING ARABINOGALACTAN
Mark F. Adams, Pullman, Wash., assignor to St. Regis Paper Company, New York, N.Y., a corporation of New York
Filed Oct. 15, 1965, Ser. No. 502,815
17 Claims. (Cl. 260—209)

This application is a continuation-in-part of my copending applications Serial Nos. 258,276 and 258,307, both filed on February 13, 1963, both now abandoned. These copending applications are, in turn, continuations-in-part of my application Serial No. 37,445, filed June 30, 1960, and now abandoned.

This invention relates to arabinogalactan, the carbohydrate wood sugar found in great abundance in the wood of western larch (*Larix occidentalis* Nutt.). It is particularly directed to a process for recovering arabinogalactan in highly pure form, and involves extraction of finely divided larch wood, either chips or ground wood. The invention is also directed to a novel arabinogalactan extract and dry product. The products of the present invention may be used as substitutes for gum acacia, as a raw material for the production of mucic acid. They have excellent film forming properties, are good emulsifiers, and among numerous other uses are currently finding wide application as a component of lithographic fountain solutions.

Arabinogalactan is a polysaccharide, made up of galactose and arabanose units in the ratio of approximately five or six to one. It is found in abundance in the roots and lower trunk of the western larch tree. While the arabinogalactan is present throughout the tree, the lower portion of the trunk, referred to as the "butt cut," contains so much arabinogalactan, of the order of 15 to 25% and more of the weight of the dry log, that the butt cut is neither good for lumber nor for pulping purposes. For years this portion of the tree has been discarded and left in the forest. Butt cuts so discarded forty years ago remain exceedingly well preserved.

It has been established that arabinogalactan is composed of two components, one with an average molecular weight of about 100,000, and the other with an average molecular weight of about 16,000. In extracts heretofore obtained from larch wood and dry products produced from these extracts the low molecular weight component has constituted at least about 30 to 55% by weight of the arabinogalactan. In accordance with the present invention, on the other hand, novel arabinogalactan extracts and dry products are produced which contain very substantially lower quantities of the lower molecular weight component. These products differ from those heretofore obtained in several other respects, as set forth in detail hereinafter.

While arabinogalactan can be extracted from larch wood with water, the processes heretofore employed have produced a product with an inordinately high content of the lower molecular weight material and have also removed other materials from the wood which constitute objectionable impurities in the product. Primarily as a result of the latter, arabinogalactan has not been a commercial product. Single step extractions or digestions, characterized by the processes set forth by Wise and Peterson, Industrial and Engineering Chemistry, vol. 22, No. 4, p. 362 (1930), and by Austin, Journal of the Forest Products Research Society, vol. IV, No. 1, p. 7 (1954), have produced extracts of concentrations only of the order of about 5–8% arabinogalactan which contained impurities in very substantial concentration. Thus, appreciable heat is required to obtain a dry product or solution of useful concentration and cumbersome purification techniques are required. Also it is believed that the products so produced have undergone substantial hydrolysis of the arabinogalactan material extracted by reason of the high temperatures employed.

While the literature attests that considerable work has been done on the extraction of larch wood, until the advent of the present invention no commercial process has been forthcoming. Appreciable patent art exists on this subject, for example the several U.S. patents to Acree, with No. 2,073,616 most clearly setting forth the Acree concept for recovery of values from the western larch. In all of the Acree work the product of interest has been galactose, one of the products of hydrolysis of arabinogalactan. According to Acree, the wood is extracted with very dilute acid or with water at temperatures ranging from about 85° C. to 160° C. The acid extract of course very substantially hydrolyzes the arabinogalactan, and water at the aforementioned temperatures also produces a mixture of galactan and galactose due, it is believed, to appreciable hydrolysis of arabinogalactan at such high temperatures. In both cases the purity of the extract which Acree produces is only between about 75 and 80%. In order to produce a commercially usable product, it is necessary for Acree to separate the tannins, oils, colloids and so forth from his crude material by flocculation and other purifying and clarifying techniques. The wood extract which Acree obtains is also characterized by comparatively very high proportion of the low molecular weight component to the macro molecule.

Characteristic of all of the prior art methods for extracting western larch is the comparatively very high temperature employed, and the relatively low concentration of the desired wood sugar in the extract. While there can be no doubt that the rate of extraction of solubles from larch wood can be increased by operating a digestion or leaching process at high temperature, the price paid for such operation is a poor yield of unhydrolyzed product, or a product which is substantially hydrolyzed. The concentration of the product is substantially lower and the impurity level substantially higher than a commercial process and product dictate.

Thus it is apparent that a method for extracting arabinogalactan from larch which would not substantially alter this carbohydrate wood sugar, and which would produce a solution of high concentration and low impurity level would be highly desirable. It is accordingly an object of the present invention to provide a commercial, economically attractive process for extracting useful value from western larch wood. It is a further object of the present invention to provide an arabinogalactan extract of western larch of high concentration and high purity which is characterized by relatively low reducing power, indicating a low degree of hydrolysis, and by a low ratio of low molecular weight component to high molecular component.

In accordance with the broader aspects of the present process, finely divided larch wood, either ground or in the form of wood chips, is extracted with an aqueous liquid solvent for the arabinogalactan at a temperature from just above the freezing point of the solution up to about 160° F. to obtain a novel arabinogalactan product.

In accordance with one aspect of this invention the larch wood is extracted or leached in countercurrent fashion with an aqueous liquid solvent for the arabinogalactan. The leaching is so conducted that the liquid solvent containing a low concentration of arabinogalactan contacts wood from which the greater part of the arabinogalactan has been leached, and the solvent containing a high concentration of arabinogalactan contacts fresh wood. In the presently preferred embodiment of this aspect of the invention, fresh liquid solvent, desirably water, initially contacts spent wood and the solvent containing the highest concentration of arabinogalactan contacts the freshest wood. When larch wood in the system is spent or substantially relieved of its arabinogalactan content it is discarded from the system, but leaching is intentionally continued with the liquid solvent which then contains the highest concentration of arabinogalactan brought into contact with additional fresh wood. The leaching is so continued with the addition of fresh wood to raise the concentration of arabinogalactan in the leaching liquid to a predetermined or desired level, which is always above about 8% by weight and is preferably above 10%. By so operating the concentration in the extract can, if desired, be raised to as high as 45–50%. In any event, the concentration is raised very appreciably above levels attainable by processes previously reported.

The preferred solvent is water. As a matter of convenience herein the invention will be further described with reference to water, but the term is not to be construed as limiting the invention to the use of substantially pure water. It will be apparent hereinafter that the water may contain dilute organic acids.

The present process differs from a normal or conventional countercurrent leaching extraction, which is terminated when the solid or wood being extracted has reached its minimum solubles content, wherein the soluble/solvent ratio in the wood is the limit of the soluble/solvent ratio in the extract in this important respect: The present process increases the soluble/solvent ratio in the extract by continuously or periodically introducing additional fresh wood to the system to remove solvent from the extract in such a manner as to produce an extract with a much higher soluble/solvent ratio than is present in the feed wood itself. This is accomplished by reason of the fact that the fresh wood takes up water, i.e. solvent, faster than it takes up the arabinogalactan dissolved in the solvent. Thus, in accordance with the present invention, the countercurrent leaching process is continued by discarding spent wood from the system and adding fresh wood and continuing the leaching of the fresh wood with arabinogalactan to raise the concentration of the latter to the aforesaid predetermined level at which extract product may be withdrawn from the system.

The moisture content of the fresh chips or ground wood has a direct bearing upon the leaching rate with water and the ultimate solution concentration attainable at any given temperature and leaching rate.

A simple series of tests was carried out with chips approximately ½ inch long with a minimum thickness of ⅛ inch. Equal portions of bone dry chips, chips containing 25, 50 and 100% moisture were extracted in the present countercurrent fashion using the same number of extraction stages. The maximum liquor concentrations obtained at these moisture contents were as follows:

| | Percent |
|---|---|
| Bone dry | 34.4 |
| 25% (air dry) | 31.8 |
| 50% | 29.4 |
| 100% | 19.5 |

While the highest liquor concentration was obtained with bone dry chips, these materials did not extract nearly as easily as the wetter wood, because the arabinogalactan was not in solution in the bone dry chips, and had to be dissolved before it could diffuse from the wood. The optimum moisture content as respects water leaching rate and solution concentration is about 25%, which corresponds roughly to air dry chips. Mill run chips have a moisture content of between about 15 and 75%, with many specimens about 50% on a dry wood basis. As can be seen from the results of the above tests, the higher the moisture content of the wood the lower the maximum attainable liquor concentration. On the other hand, the 100% moisture chips had the highest initial leach rate.

The leaching rate is directly rated to the degree of subdivision of the wood. In the case of chips, it is dependent upon the length of the grain in the chip rather than overall size because diffusion of the sugar from the wood is in the direction of the grain. Chip size may be dictated by the final disposition of the extracted chip. For example, if the extracted wood is to be employed in a pulping process, a certain minimum chip size is generally required, whereas if the extracted wood is to be discarded, burned as fuel or made into pressed wood products, the wood is ground to comparatively very small size. The smaller the wood particle or the shorter the wood chip in the direction of the grain the higher the leaching rate, or the higher the arabinogalactan concentration of the extract obtainable in a given time at a given temperature. Total leaching time required to a given concentration of arabinogalactan in the leach liquid can easily be ascertained in the laboratory for chips or ground wood of a given size.

In the present process the desired or predetermined level to which the rabinogalactan concentration of the leaching liquor is raised, as noted earlier, to at least above 8% by weight arabinogalactan. As a practical matter minimum concentrations of about 10–15% arabinogalactan will generally be obtained, but this is governed somewhat by the capacity and efficiency of drying equipment or techniques employed to dehydrate the extract partially or completely. Concentrations as high as 35–40% are easily obtained with room temperature leaching liquid, with leaching efficiencies as high as about 90%. The term "room temperature" when referring used herein shall be understood to encompass a temperature range of about 60°–85° F.

The aforementioned novel method of operating the leaching process in accordance herewith to very substantially build up the concentration of arabinogalactan in the extract is not dependent upon the temperature at which the extraction is conducted. High liquor concentrations may be obtained more rapidly, i.e., leaching rate increased, as the temperature of the leaching liquor is increased, but increased temperature introduces more impurities as will be fully apparent hereinafter. Accordingly, where the present process is carried out to produce the highly pure extracts or dry products of the appended product claims with particular reducing powers and ratios of high and low molecular weight components, the extraction is carried out below 160° F., and preferably below about 150° F. At the latter level the arabinogalactan is about 92% pure, whereas at room temperature and below purity of about 94–98% is easily obtained. The lower temperature is limited only by the required fluid state of the solvent.

It is within the contemplation of the present invention to initiate leaching with a fresh aqueous solution which may be somewhat above 160° F., even when striving for the highly pure extract and dry products just above mentioned. However, it will be appreciated that this elevated leaching liquid temperature will rapidly fall below the aforementioned maxima for the highly pure products upon just slightly prolonged contact with the normally cooler wood. Thus, initially contacting substantially spent wood with water at say 175° F. will not affect the general character of the product removed from the other end of the leaching system since very little arabinogalactan is extracted from the wood adjacent its exit end of the system, and may provide a convenient method of assuring an average leaching temperature throughout the system of about 120°–130° F.

Further in accordance with the present process as the same may be carried out to produce the claimed highly pure arabinogalactan products, it is important that the leaching liquid be free of hydrolyzing agent in sufficient quantity to hydrolyze the product during extraction.

In the abence of added hydrolyzing agent and when the extraction is carried out below about 160° F. the extract product is not hydrolyzed and is substantially purer than extracts obtained at higher temperatures. In addition, the larch extract product has a very substantially lower ability to reduce copper salts than the high temperature extracts of the prior art. Also, the present extract is substantially different in other respects from products heretofore obtained at high temperatures by reason of the significantly different ratio of low to high molecular weight components in the present extract. The present process enables the production of a larch wood extract containing no more than about 25% nor less than about 1–2% by weight of the low molecular weight component based upon total arabinogalactan in the product. As pointed out in detail subsequently my extract product differs not only from products obtained by prior art methods with respect to concentration and purity, but also differs in kind from the material of the prior art extracts.

In the accompanying drawings:

FIG. 1 is a flow diagram illustrating one method of operating in accordance with this invention;

FIG. 2 is a flow diagram illustrating an optional method of operating the present leaching process;

FIG. 3 is a schematic illustration of a continuous countercurrent extraction in accordance with the present invention employing screw type conveyor means for directing wood through the system;

FIG. 4 is a schematic representation of alternate screw conveyor means for carrying out the present process;

FIG. 5 is a further schematic representation of other means for practicing the process;

FIG. 6 is four series of schlieren photograph reproductions at the indicated bar angles and time intervals of ultracentrifuge runs on different larch wood extracts as described below;

FIG. 7 is an infra-red spectrogram of a room temperature extract of the present invention which was freeze dried, and FIG. 8 is a comparative group of ultra-violet spectrograms as indicated thereon, two of which are of the present product leached at room temperature in accordance with this invention.

Referring now to the present embodiment of my process in further detail with particular reference to FIG. 1, the flow diagram generally illustrated is that of an operating commercial plant for the extraction of larch wood and the production of arabinogalactan extracts of high purity and high concentration. The system consists of a plurality of units, e.g. tanks or cells, five of which are illustrated as a matter of convenience, each containing larch wood in the form of chips, for example. Fresh solvent is introduced to one of these cells as shown, withdrawn from the cell and introduced to the next succeeding cell in the system and so on through the last cell which at this point contains the freshest wood. The liquid withdrawn from this last cell if up to predetermined concentration is passed to a weighing cell and then to means for dehydrating the extract, illustrated as a drum drier from whence the dry product is passed to storage. The system as illustrated is one involving gravity flow with the wood tanks on successively lower levels, but in commercial operation the tanks are desirably on the same level and suitable pumps are provided for moving the liquid from one tank to the next.

More specifically, at start up, fresh water is introduced slowly to the first unit in the system, illustrated in FIG. 1 as the "last stage extracted wood" until it is filled. A valve, not shown, is then opened and the effluent from this "last stage" gradually fills the next cell in the system. Fresh water is continually introduced to the "last stage" as effluent is withdrawn. The next and each succeeding tank containing wood chips is filled with solution from the previous tank until the final tank indicated in the flow diagram as the "first stage fresh wood" is filled. The concentration of arabinogalactan in the effluent from this "first stage" is then determined, for example at point A in FIG. 1, and if not up to a predetermined minimum above 8%, say 10% or 35–40% as desired, a next tank of fresh wood is added at point A and becomes the new first stage. At the same time the last stage is removed from the system and the container is discharged, preferably in the manner illustrated in FIG. 1. That is to say, if the liquid removed from the discharged wood chips has an appreciable arabinogalactan conent it is returned to the system as shown in the flow diagram, together with any necessary make-up fresh water. The process is continued by thus removing units of spent wood and adding fresh wood units, and by so operating the desired concentration of arabinogalactan in the extract from the then "first stage" is ultimately reached. When this occurs the effluent from the then first stage of fresh wood is withdrawn and introduced to the weighing cell, where the quantity of product is determined and the liquid is then passed to suitable dehydrating equipment.

In operation of the aforementioned system in a commercial plant leaching is continued as described in connection with buildup of concentration, with tank changes and flow rate on a timed basis. For example, with some ten units in the system and a flow rate of about 10 gal./min. a spent tank is discarded and a fresh tank added about each 1½ hours, with the wood introduced to the system being in contact with leaching liquid for a total of about 15 hours.

In the system illustrated in FIG. 1 it can be seen that each tank of fresh chips added to the system comes in contact with the most concentrated leaching liquor, and while the wood is reaching equilibrium moisture it appreciably dehydrates and thus raises the arabinogalactan content of the liquor. In passing through this fresh wood the leaching solution dissolves water soluble material which is on the surface and becomes increasingly more concentrated. The fresh wood takes up water from the liquor faster than it takes up the soluble arabinogalactan from the leaching solution because of the very much larger molecular structure of the desired product. Once the wood in the system becomes saturated with water leaching becomes a diffusion-control process in which the arabinogalactan diffuses in normal manner from the wood fiber. Of course diffusion cannnot take place until the wood fibers are saturated with water.

The recycle technique of FIG. 2 constitutes a preferred embodiment of the countercurrent extraction technique, whether the same involves a plurality of tanks or other separate beds of larch wood or a single moving unit of wood, as per FIGS. 3–5. FIG. 2 shows the recycle technique as specifically applied in the system of FIG. 1. It will be noted from FIG. 2 that a flow rate through the leaching system is indicated as 10 gallons per minute, but that at the foot of the typical unit liquid is withdrawn at the rate of about 40 gallons per minute. The stream is divided and approximately 10 gallons per minute may be passed directly to the next succeeding unit, as indicated by the dotted line while about 30 gallons per minute is recycled to the head of the body of wood in the unit or tank. By operating this recycle system the liquid flow rate through the larch wood is appreciably speeded up and the thickness of the fluid film adjacent each chip, for example, is substantially reduced thus reducing the resistance to diffusion of arabinogalactan from the wood to the liquid phase, and accordingly speeding up the rate of extraction. Also stagnant pools in the unit are appreciably eliminated. In FIG. 2 there is also illustrated an optional heater in the recycle stream and the feed to the next unit may be heated as shown. One of the significant advantages of the recycle system is the fact that it facilitates temperature control at one or more points in the leaching system thus locally further increasing the rate of extraction.

Obviously, a wide variety of devices may be employed to carry out the basic concepts of the present process. Several means are shown in FIGS. 3–5 for continuous extraction wherein the wood constitutes a moving bed. The techniques suggested in FIGS. 3–5 involve movement of the leaching liquid and wood in an essentially countercurrent manner through the system with the wood being moved in a screw conveyor, and provide for continuing the extraction to produce an extract of a predetermined high arabinogalactan content. The leaching liquid and the wood may be moved in countercurrent relationship by any convenient means including, for example, bucket elevators with porous bottoms.

Referring to FIG. 3, there is illustrated a main extraction column 11 which is provided with a screw conveyor 12 which is so rotated by motor M to direct the finely divided larch wood to its discharge point at the head of the column. The wood is introduced to the foot of extraction column 11 by screw conveyor 13, with the arrows adjacent the devices indicating the direction of wood movement. Fresh liquid solvent is fed at the head of column 11 and concentrated liquor is withdrawn from the system where indicated at a point above the foot of conveyor 13. The apparatus illustrated in FIG. 3 has proved quite successful and was arranged as shown to facilitate solvent feed. Obviously concentrated liquor may be withdrawn from the system at a point nearer the foot of column 11, and means other than conveyor 13 might be employed to introduce fresh wood to the column.

In the arrangement of FIG. 4 a plurality of screw conveyors are provided. Three such devices, 14, 15, and 16 are illustrated and suitable connecting flights 14a and 15a and a discharge flight 17 are provided. Fresh wood enters the system at the head of screw 14 and passes as indicated by the arrows to discharge flight 17. Fresh solvent is introduced to the system at the head of screw 16 at which point in the system the greater part of the arabinogalactan has been leached from the wood. This fresh solvent and wood pass through screw 16 and the leaching liquid now containing some dissolved arabinogalactan is discharged through line 18 and introduced to the head of screw 15 where the wood contains a greater quantity of arabinogalactan. At the foot or discharge end of screw 15 the solvent stream is collected and directed through line 19 to the head of screw 14 adjacent the point of introduction of fresh wood thereto. The solvent thus passes through screw 14 along with the fresh wood and is collected and discharged from the system through line 20 at the end of the fresh wood screw if up to desired concentration. If not, one or more units similar to 14 are added at the wood feed end of the system and the stream in line 20 is directed to the head of the last such unit, at which point the fresh wood is then added to the system. Obviously, the device of FIG. 4 may constitute a single screw conveyor with provision for introduction and withdrawal of leaching solution at appropriate points.

In FIG. 5 the unit 21 is provided with means for allowing the extracting liquid to flow counter to the direction of wood movement through the device. For example, the helices of screw 22 may be perforated. In this system fresh solvent is introduced under high pressure where indicated adjacent the effective end of the screw 22. The pressure causes the liquid to flow counter to the direction of movement of the wood, and liquid product extract is withdrawn from the system adjacent the point of introduction of fresh wood. An expressing device also employing a screw is illustrated generally at 23. Extracted or spent wet wood from unit 21 enters the expressing device 23 where it is compressed and the absorbed liquid is removed and back-flowed to the end of unit 21. The wood discharged from the end of expressor 23 is substantially free of arabinogalactan.

In accordance with another aspect of the present invention I have also found that arabinogalactan can be very rapidly and very efficiently extracted from the wood when the extraction is carried out with an aqueous solvent, preferably water, and a high pressure is applied to the wood fiber when in intimate contact with the water to express the arabinogalactan solution.

In the broader aspects of the present process, the larch wood extracted is in finely ground form to facilitate rapid and efficient compression thereof when in contact with the aqueous solvent. The degree of fine subdivision of the wood is to at least through 10 mesh, preferably through 20 mesh and most desirably predominantly through 40 mesh Tyler series screen, which screen series is employed throughout this application. The finely divided material is combined with an aqueous solvent for the arabinogalactan, either during or following grinding, but in either event a substantially uniform mixture of wood and aqueous solvent is provided. The solvent is preferably water, and is also substantially free of material which when in contact with the wood at the temperatures reached prior to or during pressing of the mixture produces appreciable hydrolysis of the desired carbohydrate wood sugar. As in the previously described process organic acid such as those previously mentioned when present in dilute form speed up leaching of arabinogalactan from the wood without adversely affecting the impurity level of the extract.

The substantially uniform mixture of the thus finely divided wood and water are then introduced to a suitable apparatus for compression and expression of the liquid phase now containing dissolved arabinogalactan therefrom. Pressing may be accomplished in any convenient apparatus normally employed for expressing absorbed liquid from a solid material. For example the wood-water mixture may be passed between pressure rolls, or compressed in a cylinder press or in a screw press. The screw press and pressure roll devices enable continuous extraction in accordance with the present invention.

In order to facilitate a thorough understanding of this process and the manner in which the arabinogalactan of the wood is recovered with pressure a number of tests were carried out and are reported herein. As a basis for these tests, natural larch wood is thought of in terms of three parts: (1) The dry wood substance (DWS), or that portion of the wood which is not soluble in the aqueous solvent and not removed to the extract, and which enters the pressure leaching system and leaves it substantially unchanged. (2) The desired water soluble substance, arabinogalactan (AG), which also contains small quantities of phenolic impurities, e.g., tannins, lignin, etc., and (3) water present as absorbed moisture in the wood. Since the dry wood substance is inert, the variables in the system, water and arabinogalactan, may be based upon the dry wood substance, and the percentages of water and arabinogalactan in any DWS-arabinogalactan-water system are expressed as percentages of the dry wood substance, hereinafter referred to as percent DWSB.

The tests above mentioned are described hereinafter and include determination of the pressure required for the extraction employing a particular apparatus, the importance of the wood to water ratio in the system, the time of contact between wood and water, the importance of the particle size of the finely ground wood, the effect of temperature upon extraction efficiency. They furthermore illustrate the singular effects attainable by repeated pressure extractions of the same wood with water, and the effects upon the concentration of arabinogalactan in the extract which can be produced by contacting the extract with additional fresh wood and then pressing. Unless otherwise indicated in the tests the particle size of the ground wood is such that a major portion passes through 20 mesh screen. In the present process the wood is desirably of a particle diameter at least through 10 mesh, which is a practical maximum to rapid expression of the extract from the wood-water mixture with most devices which will be employed. Larger particles are of course within the contemplation of the invention, but their use will tend to reduce the efficiency of the process.

When water is added to the finely ground wood and completely mixed therewith prior to compressing the arabinogalactan in the wood being very soluble in water virtually immediately passes into solution. Where the wood has been ground sufficiently so that a major fraction passes a 20 mesh screen it can accommodate or absorb about 200% DWSB water, in the manner of a sponge. That is to say, the ground wood containing 200% DWSB water will not drip when held in the hand, for example. The fact that the arabinogalactan virtually immediately passes into solution is evident from the following table wherein ground wood of the aforementioned size was mixed with 200% DWSB water, and allowed to stand for the times indicated, prior to compression under the piston of a cylinder press at about 2400 p.s.i.

TABLE VIII.—EFFECT OF SOAKING TIME ON THE EXTRACT

| Soaking Time | AG Extract Concentration, Percent | Extracted Solution (g.) | AG Solids Extracted (g.) |
|---|---|---|---|
| 5 mins | 4 | 58.5 | 2.32 |
| 16 hrs | 4.3 | 54.5 | 2.32 |
| 24 hrs | 4.7 | 50.4 | 2.36 |

It is apparent that the concentration of the extracted solution increased slightly upon prolonged standing prior to compression. However, upon appreciable standing prior to compression the weight of recoverable solution decreased substantially. The net effect of the increase in concentration and the decrease in extracted solution is that the total extracted solids remains substantially constant. Thus, only sufficient soaking to assure uniform mixing is required prior to compression.

In establishing the present process the press employed consisted of an aluminum cylinder and a piston which fit into a test machine with a capacity of 120,000 pounds. Considering piston area of 10.2 sq. in., the pressure in pound/sq. in. was about 1/10 of the indicated test machine load. The expressed solution was collected in a stainless steel pan and a stainless steel plate was used on the bottom of the pan to prevent the compressed wood from reabsorbing part of the extracted solution when pressure on the piston was released. It was observed that the arabinogalactan concentration of the extract was independent of the pressure applied to the wood-water mixture. The following table clearly shows an optimum pressure of 2400 p.s.i. to recover a maximum volume of extract with the particular press employed.

TABLE IX.—EXTRACT RECOVERY AS FUNCTION OF PRESSURE

[AG Content of Wood: 7.5% DWSB; Water Content of System: 259% DWSB; AG Conc. of Extract: 2.8% w./w.]

| Run No. | Pressure, p.s.i. | Press Cake, H₂O, percent | Extract percent of Total Soln. |
|---|---|---|---|
| 1 | 800 | 117.2 | 54.9 |
| 2 | 1,600 | 93.4 | 61.4 |
| 3 | 2,400 | 84.7 | 67.6 |
| 4 | 3,200 | 88.0 | 65.6 |
| 5 | 4,000 | 96.4 | 63.9 |

In the above table, the figures reporting the water content of the pressed wood fibers, i.e. the press cake, are slightly higher than normal due to slight reabsorption of the extract by the press cake after pressure was released. This condition was corrected by providing a vacuum take-off for the extract.

In subsequent tests reported herein the optimum pressure of 2400 p.s.i. was employed in the aforementioned press. Of course it will be readily apparent that in devices other than this simple press the optimum pressure may vary substantially from 2400 p.s.i., particularly where the press permits agitation or mixing during pressing.

The present process is desirably carried out to produce the novel arabinogalactan extract of high purity, heretofore described, and to this end pressure extraction in accordance herewith is conducted at temperatures below about 160° F. However, as before arabinogalactan may be rapidly expressed from larch wood in accordance with this invention at temperatures above this level where purity of the extract and the character of the arabinogalactan therein is not an important factor, or where the time during which the material is at the higher temperature is not long enough to allow appreciable hydrolysis.

Preferably, the process is carried out at room temperature, i.e. about 60-85° F. The effect of temperature in a range from just above freezing to 150° F. is illustrated by the following runs:

TABLE X.—EFFECT OF TEMPERATURE

[AG Content of Wood: 27.5% DWSB; Water Content of System: 194% DWSB; AG Conc. of Extract: 12.4% w./w.]

| Run No. | Temp. (° F) | Press Cake | | Extract percent of Total Soln. |
|---|---|---|---|---|
| | | H₂O Content, percent | AG Content, percent | |
| 1 | 39 | 65.7 | 9.5 | 65.0 |
| 2 | 73 | 55.0 | 7.6 | 72.0 |
| 3 | 104 | 47.0 | 6.7 | 75.7 |
| 4 | 150 | 41.0 | 5.9 | 79.0 |

It is apparent from Tables IX and X that at least 60% of the arabinogalactan present in the wood was removed in a single pressure extraction. As shown in Table X 65.0% of the arabinogalactan solution was obtained at 39° F., while 79.0% was obtained at 150° F. At room temperature at least about 70% of the arabinogalactan solution, and therefore of the arabinogalactan originally in the wood, is consistently obtained as extract. The percent of total solution in the extract indicates that not quite all of the arabinogalactan was dissolved at 39° F., and accordingly at this low temperature a slight holding time before pressing is indicated.

Referring further to Table X, it will be seen that at 150° F. the press cake contained only 41% by weight water, and it has been observed in many other tests that the moisture content of the press cake is never less than about 35%, regardless of the quantity of water which is mixed with the ground wood. Accordingly, 35% water based on the dry wood substance of the starting wood (DWSB) appears to be the minimum water content of the system being pressure extracted. Thus, at least 35% DWSB water is required in the system in order to enable the expression of any appreciable extract.

In the tests reported in Tables IX and X and in those set forth hereinafter, approximately ten minutes elapsed from the time water was added to the ground wood until the extract was collected and the cake pulled out of the press. Time during which pressure was applied to the mixture averaged about three minutes. When the pressure reached 2400 p.s.i. the run was concluded, that is to say pressure was not held for any appreciable period.

The effect of various volumes of water in the wood-arabinogalactan-water system is illustrated in the following table.

TABLE XI.—EFFECT OF WATER TO DRY WOOD SUBSTANCE RATIO

| Run No. | Percent Wood Mixture before Pressing (DWSB) | | Press Cake, percent | | Extract, percent | |
|---|---|---|---|---|---|---|
| | H₂O | AG | H₂O | AG | Total Soln. | AG Conc. |
| 1 | 90 | 25 | 55.5 | 15.8 | 38.1 | 21.7 |
| 2 | 90.6 | 25 | 60.6 | 15.6 | 36.4 | 21.6 |
| 3 | 197 | 25 | 57.0 | 7.3 | 71.4 | 11.2 |
| 4 | 125 | 7.5 | 41.3 | 2.9 | 67 | 6.6 |
| 5 | 184 | 7.5 | 42.4 | 1.4 | 80 | 3.8 |

As may be apparent from the foregoing description, the concentration of the final extract is determined by the total arabinogalactan in the dry wood substance-arabinogalactan-water system. At any given pressure, the ratio of water to DWS in the press cake is essentially constant. Thus, by increasing the water to DWS ratio in the original system prior to pressing, a lower arabinogalactan concentration is obtained in the extract, but a higher percentage of the total arabinogalactan is removed to the extract. The latter is clearly indicated by the results reported in Table XI.

Above about 200–250% water (DWSB) the mixture takes on the character of a slurry, which is generally not as conveniently handled before or during pressing in most conventional presses as the wood mixture which is simply saturated with water. However, the present invention also contemplates pressing a slurry.

The particle size of the ground, milled or defibrated wood has a definite bearing upon the efficiency of the present pressure leaching. Several series of runs were conducted with wood, containing various amounts of arabinogalactan, which had been milled and screened as indicated in the following table. The larch wood for these tests was prepared by running 4" x 4" rough sawed western larch through a Sumner chipper. The chips were then hammer milled. Further reduction was accomplished with a Bauer or a Wiley mill.

can be removed from the finer wood particles, thus improving the efficiency of the process. Also of special interest is the fact that by proper grinding and screening the arabinogalactan content is increased in the fine particle fraction and decreased in the coarser fraction. This leads to the conclusions that either the arabinogalactan is broken free from the surface of the coarse particles and appears as free arabinogalactan in the fine particle fraction or the arabinogalactan is contained in higher concentration in the softer, more easily ground wood. In Run 5 of Table XII where the wood was Bauered with an opening of 0.10" between plates, approximately 28.8% of the ground wood passed 40 mesh screen but this fraction contained 40.6% of the available arabinogalactan.

In the accompanying drawings, FIG. 9 is a flow diagram illustrating the present process involving a single pressing operation, and also illustrating an optional additional step wherein the press cake from the previous extraction is again extracted with fresh water;

FIG. 10 is a flow diagram of another embodiment of the present process involving pressure extraction so carried out as to raise the arabinogalactan concentration of the extract to a desired or predetermined level, and FIG. 11 is a schematic representation of a device for continuously pressure leaching ground larch wood.

At least 60% and often more than 80% of the aqueous phase in the arabinogalactan-wood-water system can

TABLE XII.—EFFECT OF PARTICLE SIZE

| Run No. | Particle Size | Percent Wood Mixture before Pressing (DSWB) | | Press Cake, Percent | | Extract, Percent | | |
|---|---|---|---|---|---|---|---|---|
| | | H₂O | AG | H₂O | AG | Total Soln. | AG | Efficiency |
| 1 | −20 mesh | 189 | 17.1 | 52 | 5.6 | 71 | 8.5 | 67 |
| 2 | −20; 40 | 178 | 19.0 | 49 | 8.1 | 80 | 9.6 | 57 |
| 3 | −40 | 202 | 34.7 | 59 | 6.8 | 84 | 14.6 | 80 |
| 4 | +40→40¹ | 178 | 19.0 | 51 | 6.2 | 71 | 9.6 | 67 |
| 5 | Bauered² | 187 | 25.0 | 52 | 10.1 | 70.5 | 11.8 | 60 |
| 6 | ----do³ | 187 | 25.0 | 50 | 4.9 | 74.2 | 11.8 | 81 |
| 7 | ----do⁴ | 187 | 34.7 | 53 | 8.6 | 82.6 | 15.5 | 75 |

¹ Same as Run 2, except ground in Wiley mill to pass 40 mesh screen.
² Bauered with 0.100 inch opening between plates.
³ Bauered with 0.050 inch opening between plates.
⁴ Same as Run 6 except screened through 40 mesh screen.

Wiley milling and Bauering at 0.10" and 0.05" plate openings gave the following particle size distribution.

TABLE XIII

| Mesh Size | Bauer Milled 0.100" Plate Opening | Bauer Milled 0.050" Plate Opening | Wiley Milled |
|---|---|---|---|
| +20 | 30.0 | 8.8 | 12.6 |
| −20; 40 | 41.2 | 40.6 | 53.7 |
| −40 | 28.8 | 53.7 | |
| −40; +200 | | | 19.1 |
| −200 | | | 15.1 |

From Table XII it will be noted that in a single pressing a greater percentage of the arabinogalactan solution be recovered in a single pressing. If the press cake is resaturated with water and repressed 60–80%, for example, of the arabinogalactan remaining in the press cake can be recovered, and by thus reemploying the press cake the efficiency of the process can thus be raised to very nearly 100%. Operation of the present process to this end is amply illustrated in Table XIV where the wood of varying arabinogalactan content and particle size was extracted three of four times with room temperature water. The material of Run 1 was a sample of larch wood ground to pass through 10 mesh screen. In Runs 2 and 3 all of the wood fiber was that portion of Run 1 wood which passed through 40 mesh, and in Run 4 fibers of Run 1 wood passing 20 mesh but retained on 40 mesh were fine ground to pass 40 mesh.

TABLE XIV.—EFFECT OF REPEATED LEACHING (MAXIMUM EFFICIENCY)

| Run No. | Percent Wood Mixture Before Pressing (DWSB) | | Press Cake, Percent | | Extract, Percent | | Treatments | Efficiency, Percent |
|---|---|---|---|---|---|---|---|---|
| | H₂O | AG | H₂O | AG | Total Soln. | AG | | |
| 1 | 219 | 25.0 | 85 | 9.7 | 61.3 | 10.2 | 1st | 61.2 |
|   | 235 | 9.7  | 83 | 3.4 | 64.8 | 4.0  | 2nd | 86.4 |
|   | 254 | 3.4  | 82 | 1.1 | 67.6 | 1.3  | 3rd | 95.6 |
|   | 246 | 1.1  | 85 | 0.4 | 65.2 | .4   | 4th | 98.4 |
| 2 | 256 | 34.7 | 55.4 | 7.8 | 78.5 | 12.2 | 1st | 77.5 |
|   | 286 | 7.8  | 57.0 | 1.7 | 79.5 | 2.6  | 2nd | 95.0 |
|   | 304 | 1.7  | 57.0 | .4  | 80.4 | .6   | 3rd | 98.8 |
|   | 292 | .4   | 57.6 | .1  | 80.6 | .1   | 4th | 99.7 |
| 3 | 202 | 34.7 | 59.0 | 6.8 | 84   | 16.8 | 1st | 80 |
|   | 204 | 6.8  | 61.5 | 1.8 | 69.8 | 2.7  | 2nd | 94.5 |
|   | 230 | 1.8  | 87.0 | .68 | 62   | .75  | 3rd | 98.3 |
| 4 | 178 | 19.0 | 51.0 | 6.2 | 71   | 9.6  | 1st | 67 |
|   | 222 | 6.2  | 52.4 | 6.4 | 76.3 | 2.7  | 2nd | 93 |
|   | 182 | 1.4  | 54.3 | .5  | 70.1 | .75  | 3rd | 97.5 |

The method of operation reported in Table XIV through two extractions is illustrated in FIG. 9. It will be appreciated from the efficiency column of Table XIV that after two expressions about 85–95% of the arabinogalactan available in the wood has been removed.

A process in accordance with my invention is illustrated in FIG. 10, whereby the arabinogalactan content of the extract is built up by admixing the extract from one pressing with fresh wood, again pressing and, if desired, continuing this sequence to produce a desired or predetermined extract concentration. When an arabinogalactan solution is added to finely divided fresh wood the arabinogalactan contained in the wood goes into solution thereby increasing the concentration of the aqueous phase of the DWS-arabinogalactan-water system. The final extract concentration obtainable in this fashion is established by the total amount of arabinogalactan in the DWS-arabinogalctan-water system, and this is independent of whether the arabinogalactan is brought to the system in the wood or in the solution.

The following table shows results attainable by repeated treatment of fresh larch wood, first with water and then with arabinogalactan solutions of different concentrations. In Run 1 wood fiber containing 7.5% arabinogalactan (DWSB) was mixed with the indicated quantity of water and pressed. The extract of Run 1 was then contacted with additional fresh wood of the same arabinogalactan content and pressed in Run 1a. The resulting extract was then mixed with additional fresh wood and again pressed in Run 1b. In Run 2, wood containing 25% arabinogalactan (DWSB) was extracted with water. In Run 2a an equivalent quantity of the same wood was extracted with a 3% arabinogalactan solution, and in Run 2b the extract of Run 2a, which contained 12.8% arabinogalactan, was mixed with a further equivalent quantity of fresh wood and the mixture pressed.

TABLE XV.—BUILDUP OF CONCENTRATION IN EXTRACT

| Run No. | Percent wood misture Before Pressing (DWSB) | | Press Cake, Percent | | Extract, Percent | |
|---|---|---|---|---|---|---|
| | H₂O | AG | H₂O | AG | Total Soln. | AG |
| 1   | 184 | 7.5   | 42.4 | 1.4 | 80   | 3.8 |
| 1a  | 178 | 11.75 | 45.6 | 3.7 | 69   | 7.1 |
| 1b  | 172 | 15.5  | 41.4 | 4.5 | 75   | 10.0 |
| 2   | 189 | 25.0  | 55   | 7.3 | 70.6 | 11.7 |
| 2a  | 221 | 32.4  | 60   | 8.8 | 69   | 12.8 |
| 2b  | 192 | 40.8  | 60   | 12.5 | 74.5 | 17.6 |

Tables XIV and XV clearly show that my pressure extraction process can be operated to approach 100% efficiency and to produce arabinogalactan solutions of a desired high concentration. On the other hand, where concentration of the extract is not important or where oversized dehydrating equipment is available for the production of a dry product, simply resaturating the press cake with water, reprocessing and combining the extract with that obtained from a first pressing may produce a product of satisfactory concentration. Of course, it will be more dilute than the extract from the first expression. Where extracts of high concentration are essential, two or more pressure extractions as illustrated in FIG. 10 will be performed.

In FIG. 11 there is illustrated a fairly simple device for a continuous pressure extraction in accordance with the present invention. Coarsely ground wood or milled wood chips are introduced to a Bauer mill, for example, to which water or fresh aqueous solvent may be added if desired. The defibrated wood from the Bauer is continuously introduced to a screw type expressing device, provided with a helix of varying or variable pitch to assure thorough pressing of the wood. Water or fresh aqueous solvent is added at the head of the press where indicated, and extract is collected in the trough at the base of the device and withdrawn where shown. The end of the press may be tapered as indicated to further assure expression of all of the liquid possible from the wood.

A further device for carrying out the present process involves a pair of large cooperating pressure rolls and a pair of weirs of dams, one at each end of the rolls, to provide a pool of substantial volume above the nip for receiving the ground wood and water mixture to be pressed. Fresh ground wood and water are added to this pool and operation of the press rolls begun, and the arabinogalactan content of the water in the pool will gradually increase. Since the wood fiber passing through the nip will contain about 35% by weight water, at least this quantity of water must be added to the pool, either as water or as moisture in the wood. By adding further fresh wood and water the concentration of the liquid in the pool may be raised to a desired or predetermined level, at which point extract product of desired concentration may be withdrawn. If water is added to the pool at the same rate extract product is withdrawn and in amount equal to the solution absorbed by wood passing the nip, a constant volume may be maintained in the pool. By controlling the water and arabinogalactan added with the wood to the pool, the water to arabinogalactan content of the extract solution can be controlled.

From the foregoing it will be apparent that the present invention provides a larch wood extraction process in which the water requirements are very substantially lower than in any leaching process which does not employ pressure. Also, the time required to extract the arabinogalactan values from the wood is very greatly reduced, that is to say from a matter of several hours to a few minutes. The efficiency of my pressure extraction process can easily be raised from about 60–80% to nearly 100%, and when so operating the system requires comparatively few extraction units.

Defibrating the wood to the extent necessary to assure most efficient operation of the present process tends to leave the fibers too small for use in normal papermaking. However, several commercial uses exist for the residual wood including its use in high and low density fiber board and corrugated medium, as a filler for plaster board, and as a core material for laminated board. Pending development of pulping equipment geared to the use of small fibers, this wood residue would not be utilized in the normal production of paper.

In the appended claims the term "finely ground" shall be understood to include defibrated wood.

Regardless of the apparatus employed to carry out my novel larch wood extraction, I have found that the impurity level of the product can be appreciably reduced by subjecting the extract to temperatures well above 160° F. for a short period of time to remove water and produce a dry product. During this rapid drying of the extract, a major portion of the impurities are distilled from the liquor, and the resulting dry product is of a purity between about 94 and 99.5%, as compared with a starting liquor product of about 92–98% purity. There is substantially no loss of arabinogalactan by hydrolysis when the extract is dried in this manner since the elevated temperature is maintained for so short a period of time. This rapid dehydration of the leaching liquid product is desirably effected by spray drying or on a drum dryer. Also the extract may be rapidly dehydrated under conditions of reduced pressure at substantially lower temperatures, with all of the advantages just mentioned.

At the comparatively low leaching temperatures of the present process the impurities carried over to the concentrated leaching solution product are not present in amounts sufficient to show up significantly on an infra-red spectrogram. Reference may be had to FIG. 7 for the infra-red spectra of a liquid extract product in accordance with the present invention produced with room temperature leaching water. This spectra is the same as that of the drum dried material. The impurity level of the room temperature leach liquid product is so low, of the order of about 1½–3% that it does not produce a change in the infra-red. These impurities in the leaching liquid do show up in ultra violet spectrograms shown in FIG. 8.

Referring to FIG. 8 in detail, at pH 5.1 the ultra violet spectrogram of arabinogalactan freeze dried from extract produced by room temperature leaching in accordance with this invention (Curve 2) appears to be similar to that of the high temperature leached product (Curve 3). The curves appear to differ only in concentration of impurities as represented by the absorption at about 288 millimicrons in the present product and at 279 millimicrons in Curve 3. However, a comparison of ultra violet spectra at pH 11 (Curves 4 and 5) shows marked differences in the two materials. The high temperature product changes very little while the curve of the present product shows a shift to 320 millimicrons. Thus, while the spectra at pH 5.1 would seem to indicate simply a difference in concentration of impurities, with the product of the present invention having a substantially lower impurity content, the spectra at pH 11 clearly shows that the impurities in the present product are of an entirely different character from those in the high temperature material. It is further evident that the high temperature material contains impurities which are not found in the present product. The shift to the right at the higher pH is characteristic of aromatic compounds, and indicates that this type constitutes a major portion of the impurities.

It will be recalled that the present process employs a liquid aqueous solvent. In the presently preferred embodiment of the process, this solvent is water. Also, the starting water is preferably substantially free of strongly acidic materials or other chemicals which at the leaching temperatures are capable of effecting any substantial hydrolysis of the arabinogalactan.

The detrimental effects of added mineral acid upon the character of the desired arabinogalactan products are readily apparent when the present process is compared with that of the aforementioned Acree U.S. Patent No. 2,073,616. The effect of simple organic acids upon the quantity of arabinogalactan which may be obtained from the wood and upon the impurity level of the extract have now been ascertained. While it is well known that arabinogalactan is not soluble in pure organic solvents, yet certain of these materials, for example methyl or ethyl alcohol are employed in its purification, and accordingly tests were conducted in order to ascertain the effect upon extraction of the presence of various quantities of methyl and ethyl alcohol in the leaching water and also to observe the effect of another water soluble organic material, acetone. These tests also included acetic and formic acids and dilute sodium and ammonium hydroxides.

In carrying out these tests 100 grams (dry wood basis) of larch wood was ground to pass a 20 mesh screen and then placed in an 800 ml. beaker. To this 500 ml. of the solvent or solvent system was added. The mixture was allowed to stand for two hours at about 25° C. with occasional stirring. After this time, the wood was separated from the mixture by suction filtration and the filtrate was analyzed for total dissolved solids and for relative content of aromatic compounds by the Folin-Denis procedure. The results of these tests with the materials investigated at the indicated concentrations are recorded in the following table:

TABLE I

| Solvent System | Total Dissolved Solids (6/100 ml.) | Folin-Denis Absorbency [1] | Ratio [2] Phenols:Solids × 100 |
|---|---|---|---|
| 100% H₂O | 3.94 | .120 | 3.05 |
| MeOH:H₂O: | | | |
| 1:3 | 3.03 | | |
| 1:1 | 2.97 | .524 | 17.6 |
| 3:1 | 0.75 | .638 | 83.3 |
| 1:0 | 0.61 | .565 | 91.0 |
| EtOH:H₂O: | | | |
| 1:3 | 2.68 | .305 | 11.4 |
| 1:1 | 2.26 | .590 | 26.4 |
| 3:1 | 0.76 | .730 | 96.0 |
| 1:0 | 0.31 | .292 | 94.0 |
| Acetone:H₂O: | | | |
| 1:3 | 2.87 | .454 | 15.8 |
| 1:1 | 1.07 | .738 | 69.0 |
| 3:1 | 0.96 | .824 | 86.0 |
| 1:0 | 0.28 | .268 | 96.0 |
| 50%(1:1 MeOH-EtOH)+50% H₂O | 3.15 | .587 | 18.5 |
| 50%(1:1 Acetone-MeOH)+50% H₂O | 1.78 | .772 | 43.5 |
| NaOH: [3] | | | |
| 0.25 N | 3.75 | .821 | 21.7 |
| 1.25 N | 5.00 | .822 | 16.4 |
| 2.5 N | 5.10 | .824 | 16.1 |
| NH₄OH: [4] | | | |
| 0.25 N | 4.75 | .732 | 15.4 |
| 1.25 N | 4.89 | .762 | 15.6 |
| 2.5 N | 4.90 | .735 | 14.9 |
| HOAc: | | | |
| 0.25 N | 4.31 | .160 | 3.7 |
| 1.25 N | 4.68 | .227 | 4.85 |
| 2.5 N | 4.73 | .353 | 7.5 |
| HCOOH: | | | |
| 0.25 N | 4.37 | .156 | 3.6 |
| 1.25 N | 4.68 | .198 | 4.2 |
| 2.5 N | 5.34 | .276 | 5.2 |

[1] Folin-Denis Procedure: Two ml. of the filtrate was diluted to 50 ml. and 4 ml. of the diluted solution was placed in a 100 ml. volumetric. Folin, Denis reagent (2.5 ml.) and 13 ml. 20% Na₂CO₃ were added. The solution was made to volume, allowed to stand at 30° for 30 minutes and the absorbency read immediately at 720 millimicrons.

[2] Absorbency readings are directly proportional to the concentration of aromatics thus the ratio of absorbency reading to g./100 mls. of solids is a valid figure.

[3] In determining total dissolved solids in the NaOH systems, a portion of the filtrate was first neutralized with HCl. An aliquot of the neutralized solution was evaporated at 100° C to obtain total residue, and then the residue was calcined at 500°. The loss in weight on calcination is reported as total dissolved (organic) solids.

[4] The NH₄OH solutions were evaporated at 100° to obtain total residue. Kjeldahl determinations on the residues indicated that the amount of NH₃ left in the residues was negligible, therefore, the amount of residue after evaporation at 100° C. is reported as total dissolved solids.

With the water extract as the reference base, it is quite apparent that the simple water soluble organic solvents, methyl alcohol, ethyl alcohol and acetone, significantly decrease the solubility of arabinogalactan and increase the solubility of aromatic constituents of the wood. Both sodium hydroxide and ammonium hydroxide increase the total dissolved solids but at the very significant expense of inordinately high comparative phenolic levels. This latter factor precludes the uses of ammonia or sodium hydroxide. However, acetic acid and formic acid both increase the total dissolved solids content by approximately 20%, without appreciably increasing the phenolic content of the extract. Accordingly, these materials may be employed in the extractions of the present process to increase the leaching rate, if desired.

Referring now to the products of this invention in greater detail, my novel larch wood extract and dry product are characterized not only by their high degree of purity, but also it has been found that the present products differ very significantly from any such materials heretofore produced. The purity of my extract product is always between about 92 and about 98%, and the dry product is about 94–99.5% pure.

The impurities of the extract are of course removed from the wood along with the arabinogalactan, and it has been found that they are predominantly phenolic in character. Among these phenolic impurities, taxifolin and aromadendrin have been isolated, but ether insoluble lignins and tannins make up the major portion. Traces of at least three unknown flavanoidic substances have also been detected. The impurities also comprise very small quantities of esters, terpenes and organic acids. A typical arabinogalactan extract in accordance with the present invention is one which is produced by leaching finely divided wood with water at about room temperature to a product concentration of about 15% solids. Approximately 97% by weight of the solids are arabinogalactan, 2.5% are phenolic compounds and the balance miscellaneous materials of the above non-phenolic types which have not been specifically identified. This extract product has an ash content of about 0.3%.

One of the most significant distinctions of both the extract and dry products of the present invention from prior art products is the fact that the carbohydrate component of average molecular weight of about 16,000 constitutes only about 1 to 25% by weight of the arabinogalactan, while the carbohydrate component of an average molecular weight of about 100,000 makes up the balance. These two components of significantly different molecular weight have been detected in larch wood extracts heretofore, but they have always been present in prior art extracts in the ratios of from about 1:1 to 2:1, whereas in the products hereof the ratio of high molecular weight carbohydrate to low molecular weight carbohydrate is always greater than about 3:1, and may be as high as about 100:1. Expressed another way, in the present products the carbohydrate component of about 16,000 molecular weight constitutes only between about 1 and 25% by weight to the arabinogalactan present.

A further striking and very significant distinction of the present products from arabinogalactans produced heretofore is the comparatively very much lower reducing power of both the extract and the dry material.

In order to demonstrate the significantly different reducing power and low to high molecular weight relationship in the present product as compared with typical arabinogalactan materials obtained from western larch heretofore, a series of tests was conducted involving preparation of the extract of the present invention and two typical prior art materials. As representative of the high temperature leaching techniques employed prior to the present invention the procedure of Acree U.S. Patent No. 2,073,616 and the procedure of Wise et al., Industrial and Engineering Chemistry 22, 362–5 (1930) were chosen. The product of the present invention was prepared by extraction with water at 25° C. (77° F.). The Acree process was carried out at about 125° C. (255° F.) and the technique of Wise at 100° C. Wood from the same uniform batch was employed in all tests, and this wood was representative of the cross-section of the mid-trunk of the tree. The crude extracts were analyzed for total solids, reducing sugars, pH, relative phenolic content and tannin content. The results of these tests are summarized in the following table:

TABLE II

| Procedure | Total solids (g./100 ml.) | Reducing Sugars (mg. Cu reduced by 1 g. sample) | Folin-Denis Absorbency (per 20 mg.) | Tannin (mg. Tannic Acid g. solids) | pH |
|---|---|---|---|---|---|
| Acree | 5.57 | 220.6 | .870 | 45 | 3.8 |
| Wise et al | 5.78 | 214.0 | .648 | 34 | 4.1 |
| Present Product | 4.42 | 142.6 | .366 | 19 | 4.1 |

Reducing sugars was determined by the Allihn method described on page 512 of Official Methods of Analysis of the Association of Official Agricultural Chemists, 1950 ed., and the one gram sample referred to is one gram of the dissolved solids of the respective extracts.

The Folin-Denis procedure was as follows: 2 ml. of a 1% (1 g./100 ml.) solution of the extract was pipetted into a 100 ml. volumetric flask. Folin-Denis reagent (2.5 ml.) was added, followed by 13 ml. of 20% $Na_2CO_3$. The solution was made to volume, allowed to stand for thirty minutes at 30° C. and the absorbency read at 720 millimicrons. A standard curve was prepared for tannic acid using the Folin-Denis procedure, the respective absorbency reading for each of the solutions was converted to mg. of tannic acid on the basis of this curve.

In addition to the above tests, ultracentrifuge measurements of the respective solutions at 3 g./100 ml. concentration were made at approximately 60,000 r.p.m. Reproductions of Schlieren photographs of the ultracentrifuge runs are set forth in FIG. 6, wherein Plate 1 corresponds to the present product, Plate 2 the Acree material, and Plate 3 the Wise et al. material. Plate 4 of FIG. 6 is a similar reproduced photograph of two other ultracentrifuge runs at concentrations equivalent to the runs of Plates 1–3. The upper curve is of an arabinogalactan solution produced in a commercial plant employing the process of the present invention as illustrated generally in FIG. 1 at about room temperature, and the lower curve of Plate 4 is of the same commercial material which had been purified with decolorizing carbon, a procedure normally followed to remove impurities from the material. In each reproduced photograph of FIG. 7 the high peak represents sedimentation of the faster moving high molecular weight component and the lower peak is the slower or low molecular weight component.

The sedimentation coefficients were respectively $4.5 \times 10^{-13}$ and $1.5 \times 10^{-13}$ c.g.s. units which correspond to molecular weights of the order of 100,000 and about 16,000.

The molecular weight differences between the arabinogalactan extract of the present invention and the materials of Acree and Wise et al. is readily apparent from Plates 1–3. The area under a peak on the units of each plate closely approximates the relative concentration of that component. Examination of Plates 1–3 shows that in the room temperature extract of the present invention approximately 10% of the arabinogalactan is present as the low molecular weight material. The Acree material shows the presence of the low molecular weight component to be at least about 50% of the total, while in the Wise extract the low molecular weight component constitutes about 35% of the total. The increase in the amount of the low molecular fraction is roughly proportional to the temperature used to extract the western larch wood.

Comparison of Plates 1 and 4 shows that there is virtually no variation between the commercial plant run material and that produced in the above laboratory test. However, the lower curves of Plate 4 which is the carbon-purified commercial product, show that purification has apparently removed a substantial amount of the low molecular weight fraction. This is evident by the lowering of its concentration and relative increase in the concentration of the high molecular weight fraction.

Simple separation of phenolic components from the extract by means of ion exchange or column absorption have proved unsuccessful. However, the addition of methyl alcohol in small amounts makes it possible to retain the phenolic components on the absorption column. Methyl alcohol is a known hydrogen bond breaker for such systems, and experiments show that removal of the phenolic components is also accompanied by the removal of the low molecular weight component. Thus, it can be inferred that the phenolic components are associated with the low molecular weight arabinogalactan component, but at the same time they are also associated by hydrogen bonding with the high molecular weight arabinogalactan.

The temperature at which the extraction is carried out has a direct bearing upon the impurity or phenolic content of the extract. This is substantiated by the Folin-Denis results of Table II. It is surprising, however, that the product of the present invention contains such a relatively low quantity of tannins as compared with the materials of Acree and Wise.

The Allihn reducing results definitely establish the very significantly lower reducing power of the present product as compared with the high temperature extracts of the prior art. The reduction of copper salts in solution has long been recognized as a measure of reducing sugars, and has also been used as a measure of the hydrolysis of larger polysaccharide molecules such as arabinogalactan.

The material produced in accordance with the method therein set forth is not hydrolyzed to the extent of prior art products produced at high temperature, and of course is not hydrolyzed to the extent of arabinogalactan extracted with an added hydrolyzing agent. This is demonstrated by the ultracentrifuge tests reported herein. As a result of further careful testing and analysis, it appears entirely possible that the reducing power of arabinogalactan is not only a measure of its hydrolysis but is also a measure of the aldehyde end groups on the high molecular weight component and other readily oxidizable functional groups such as o-diphenols associated with the low molecular weight component. This view is supported by the fact that purification or dialysis does not change appreciably the reducing power of the present product. However, there is no positive proof that hydrolysis is not involved, since a high concentration of low molecular weight component, perhaps as a result of hydrolysis, brings into the arabinogalactan more aldehyde end groups which would show up in the reducing tests. Accordingly, it is simply stated that the products of the present invention have very appreciably lower reducing power than larch wood extracts heretofore.

The foregoing tests clearly establish that the extract of the present invention is an entirely different product from that obtained by the high temperature techniques of the prior art. High temperature extracts definitely produce a product with a high reducing power, a high ratio of phenolic impurities and a higher low molecular weight component content than the present product, and it has been established that the material of the present invention is superior to that of the prior art when the same is employed in a fountain solution in the lithographic arts.

It should be further noted that the ratio of high to low molecular weight components and the reducing power of the aqueous extracts of the present invention are carried over to the dry arabinogalactan product hereof. As a practical matter the present products, whether aqueous extracts or substantially dry material, exhibit a reducing power between about 125 and 180 and preferably about 135–155 mg. Cu/g. (Allihn). The low molecular weight component constitutes about 1 to 25% and preferably about 2–15% by weight of the total arabinogalactan. With the leaching process conducted at 0° C. the extract has a Folin-Denis absorbency of only 0.278, contains only about 1% by weight of the low molecular weight component and its reducing power is about 125, whereas when the extraction is carried out at about 150° F. the low molecular weight component constitutes about 25% by weight and the reducing power is about 165 Allihn. At about 160° F. the Allihn figure is about 180 mg. Cu/g.

Several physicochemical properties of the product of the present invention have been determined, and serve to further distinguish it. An arabinogalactan, hereinafter designated "A," was prepared by drum drying a 15% extract produced by room temperature leaching in accordance with the present process. This dry material consisted of fine, tan-colored flakes with a woody flavor. It had an ash content of 0.29%, and contained 2.5% phenolic impurities and approximately 97% by weight arabinogalactan. The reducing power and molecular ratio were in the aforementioned ranges. This extract was purified with active carbon to substantially remove phenolics and the purified sample is designated "B" hereinafter. Viscosity, density, surface tension and interfacial tension were measured on these arabinogalactan solutions at constant temperature in a thermostatically controlled bath kept within $-0.05°$ C.

Absolute viscosities (cp.) of the solutions were determined in relation to water using an Ostwald viscometer. For each solution the average of five readings is reported, except that fewer readings were taken for the concentrated or 40% solutions, since their flow time was about thirty minutes.

For measuring the effect of electrolytes on viscosity, solutions were prepared by pipetting the required amount of 40% solution and the required amount of electrolyte into a volumetric flask so that the final solution when made to volume would contain 30 g. arabinogalactan per 100 ml. The solutions were allowed to stand at 20° C. for one hour before measuring.

Densities were determined at all concentrations and temperatures with a 25 ml. pycnometer calibrated with distilled water at 20° C.

In measuring the surface tension both ring and capillary height methods were used. With the ring method the Cenco-DuNouy interfacial tensiometer was employed. In the capillary height or rise technique the solutions were drawn up into the capillary tube by suction, and readings taken after the solution had come to rest in the capillary.

The DuNouy interfacial tensiometer was employed to measure interfacial tension between arabinogalactan solutions and clear white mineral oil. In determining the freezing point depression a Philadelphia differential thermometer was used, and for refractive index measurements an Abbe refractometer was employed and measurements were made at 20° C.

The results of these tests are set forth in the following Tables III–VII.

TABLE III.—EFFECT OF ARABINOGALACTAN CONCENTRATION ON VISCOSITY AND DENSITY AT 20±0.05° C.

| Concentration, percent (w./v.) | Absolute Viscosity, cp. | | A—Density, g./ml.* |
|---|---|---|---|
| | A | B | |
| 0.5 | 1.03 | 1.03 | 1.0002 |
| 1 | 1.06 | 1.06 | 1.0021 |
| 3 | 1.18 | 1.17 | 1.0100 |
| 5 | 1.32 | 1.29 | 1.0179 |
| 10 | 1.76 | 1.72 | 1.0375 |
| 20 | 3.52 | 3.37 | 1.0773 |
| 30 | 8.04 | 7.64 | 1.1168 |
| 40 | 23.51 | 21.67 | 1.1574 |

* The density values of arabinogalactan B differed less than ±0.3% from that of arabinogalactan A.

TABLE IV.—EFFECT OF TEMPERATURE ON VISCOSITY OF 30% (W./V.) ARABINOGALACTAN SOLUTIONS

| Temp., ° C. | Absolute Viscosity, cp. | |
|---|---|---|
| | A | B |
| 10 | 11.31 | 10.81 |
| 20 | 8.04 | 7.61 |
| 25 | 6.89 | 6.51 |
| 30 | 5.97 | 5.61 |
| 40 | 4.57 | 4.35 |
| 60 | 2.87 | 2.75 |
| 80 | 1.94 | 1.85 |

TABLE V.—EFFECT OF ELECTROLYTES (0.1 M) ON VISCOSITY OF 30% (W./V.) ARABINOGALACTAN SOLUTIONS AT 20±0.05° C.

| Electrolyte | pH | | Absolute Viscosity, cp. | |
|---|---|---|---|---|
| | A | B | A | B |
| None | 3.89 | 3.88 | 8.16 | 7.59 |
| HCl | 1.27 | 1.11 | 8.05 | 7.58 |
| NaOH | 11.5 | 11.5 | 8.68 | 8.15 |
| NaHCO$_3$ | 6.99 | | 8.38 | 7.87 |
| NaCl | | | 8.15 | 7.66 |
| Na$_2$SO$_4$ | | | 8.58 | 8.06 |

TABLE VI.—EFFECT OF ARABINOGALACTAN CONCENTRATION ON SURFACE TENSION OF WATER AND INTERFACIAL TENSION WITH MINERAL OIL $d_4^{20}$ 0.8656 G./ML. AT 20±0.05° C.

| Concentration, Percent (w./v.) | Surface Tension, Capillary Height | | Dynes/cm., DuNouy | | Interfacial Tension, Dynes/cm., DuNouy | |
|---|---|---|---|---|---|---|
| | A | B | A | B | A | B |
| 0 | 72.8 | 72.8 | 72.8 | 72.9 | 42.7 | 42.4 |
| 1 | | | | | 33.3 | |
| 3 | 72.1 | | 70.4 | 72.5 | 30.0 | 41.6 |
| 5 | | 72.4 | 68.9 | 72.4 | 28.7 | 40.7 |
| 10 | 70.7 | 72.5 | 65.1 | 72.3 | 27.1 | 40.4 |
| 20 | 69.3 | 72.2 | 62.1 | 71.8 | 25.5 | 40.4 |
| 30 | 68.5 | 72.1 | 61.4 | 71.7 | 25.3 | |
| 40 | 67.3 | 71.8 | 59.9 | | | |

TABLE VII.—EFFECT OF ARABINOGALACTAN CONCENTRATION ON FREEZING POINT DEPRESSION AND REFRACTIVE INDEX

| Concentration, Percent (w./v.) | Freezing Point, ° C. | | Refractive Index, $n_D^{20}$ | |
|---|---|---|---|---|
| | A | B | A | B |
| 0 | 0.000 | 0.000 | 1.3330 | 1.3330 |
| 0.5 | | | | 1.3337 |
| 1 | −0.019 | −0.006 | | 1.3343 |
| 3 | | −0.035 | 1.3375 | 1.3375 |
| 5 | −0.062 | −0.051 | 1.3408 | 1.3405 |
| 10 | −0.146 | −0.118 | 1.3480 | 1.3480 |
| 20 | −0.310 | −0.293 | 1.3631 | 1.3630 |
| 30 | −0.515 | −0.481 | 1.3779 | 1.3784 |
| 40 | −0.849 | −0.795 | 1.3938 | 1.3939 |

From the above results it will be apparent that the arabinogalactan of the present invention produces solutions of lower viscosity at higher solids content than many other polysaccharides of equal average molecular weight. In addition to the low viscosity characteristics, the arabinogalactan product shows excellent stabilizing and emulsifying properties. The low viscosity of the material also supports the conclusion that the product is a highly branched molecule which can have a high degree of intramolecular interactions between different parts of the same molecule.

The physical properties of viscosity, density and refractive index of arabinogalactan solutions in accordance with the present invention appear to be independent of the phenolic impurities and the suspended material found in the extract. Surface tension and interfacial tension properties are primarily a function of the phenolic impurities.

By reason of its excellent emulsifying properties and high purity, the present product can be used in pharmaceutical preparations and foods. Its emulsifying properties suggest its use in plant sprays, insecticides, etc. The low viscosity of arabinogalactan solutions suggests use in drilling muds. It is presently being employed as a fountain solution and in the production of plates in the lithographic arts.

What is claimed is:
1. A process for producing an arabinogalactan solution which comprises extracting finely divided larch wood with an aqueous liquid solvent substantially free of hydrolyzing agents for said arabinogalactan under the ex- traction conditions at a temperature of from just above the freezing point of said solvent to about 160° F.

2. A process for producing an arabinogalactan solution of high purity, which comprises leaching finely divided larch wood with an aqueous liquid solvent substantially free of hydrolyzing agents for said arabinogalactan under the extraction conditions at a temperature of from just above the freezing point of said solvent to about 160° F., so conducting said leaching that solvent containing a low concentration of arabinogalactan contacts wood from which the greater part of the arabinogalactan has been leached and the solvent containing a high concentration of arabinogalactan comes into contact with fresh wood, discarding spent wood from the system and continuing to contact solvent containing a high concentration of arabinogalactan with fresh wood to raise the concentration thereof to a predetermined level in excess of about 8% by weight arabinogalactan and withdrawing said arabinogalactan solution from the leaching system as product.

3. A process for producing an aqueous solution of arabinogalactan of high purity, which comprises leaching finely divided larch wood with liquid water substantially free of hydrolyzing agents for said arabinogalactan under the extraction conditions at a temperature of from just above the freezing point of said liquid water to about 160° F., so conducting said leaching that water containing a low concentration of arabinogalactan contacts wood from which the greater part of the arabinogalactan has been leached and water containing a high concentration of arabinogalactan comes into contact with the freshest wood, discarding spent wood from the system and continuing to contact the water containing a high concentration of arabinogalactan with fresh wood to raise the concentration thereof to a desired level in excess of about 8% by weight arabinogalactan, and withdrawing said arabinogalactan solution from the leaching system as product.

4. A process as set forth in claim 3 wherein the leaching water in the system is at a temperature between just above its freezing point and below about 100° F.

5. A process as set forth in claim 3 wherein the leaching water contains an acid selected from the group consisting of acetic acid and formic acid.

6. A process as set forth in claim 3 wherein the moisture content of the fresh wood initially contacting leaching liquid in the system is between about 15 and 75% by weight based upon the dry weight of the wood.

7. A process for producing an aqueous solution of arabinogalactan of high purity, which comprises providing a leaching system, so flowing a primary stream of liquid water substantially free of hydrolyzing agents for said arabinogalactan under the extraction conditions at a temperature of from just above the freezing point of said liquid water to about 160° F. at a given rate and finely divided larch wood countercurrently through said system that fresh water initially contacts wood from which the greater part of the arabinogalactan has been leached and the primary stream of water containing the highest concentration of arabinogalactan contacts the freshest wood, discarding spent wood from the system but introducing fresh wood thereto and contacting the primary stream of water with the then highest concentration of arabinogalactan with said introduced fresh wood to further raise the arabinogalactan concentration of said stream of water to a desired level, withdrawing solution of said predetermined concentration from the system as product, and at a selected point in said system intermediate to the points of introduction of fresh water and withdrawal of arabinogalactan solution product, withdrawing water containing dissolved arabinogalactan and recycling the same to the system at a point above the point of withdrawal thereof at a rate greater than the flow rate of said primary stream of water.

8. A process for producing an aqueous arabinogalactan solution of high purity, which comprises providing a leaching system consisting of a given number of bodies of finely divided larch wood, contacting a first body in said system with liquid water substantially free of hydrolyzing agents for said arabinogalactan under the extraction conditions at a temperature of from just above the freezing point of said liquid water to about 160° F., passing effluent from said first body of wood through a second body in said system, passing effluent therefrom to a next succeeding body in said system and so on through the last body in said system, then removing the first body from the leaching system and adding a fresh body after the said last body, continuing leaching and adding and removing bodies of finely divided larch wood from the system to raise the effluent from the final body to a desired arabinogalactan concentration in excess of about 10% by weight, and withdrawing this effluent from the system as product.

9. A process as set forth in claim 8, which also comprises rapidly dehydrating the withdrawn arabinogalactan solution at a temperature sufficiently high to distill a portion of the impurities present in the solution to produce highly pure dry arabinogalactan.

10. A process for producing an aqueous solution of arabinogalactan of a high degree of purity, which comprises providing a plurality of chambers containing finely divided larch wood, continuously introducing fresh water to the first chamber and allowing the same to flow downwardly therethrough, withdrawing liquid therefrom and introducing same to the top of the second chamber, withdrawing liquid from said second chamber and introducing same to the top of the next succeeding chamber and so on through the last chamber in the system, then removing the first chamber from the system and adding a chamber of fresh wood after the said last chamber, continuing adding and withdrawing chambers until the leaching liquid at the foot of the then last chamber has reached a desired arabinogalactan concentration in excess of about 10% by weight, and withdrawing this liquid from the then last chamber as product, the said water and liquid being substantially free of hydrolyzing agents for the arabinogalactan under the extraction conditions and at a temperature between their boiling points and 85° F.

11. A process for recovering arabinogalactan from larch wood, which comprises combining said wood in finely ground form with more than 35%, DWS basis, of an aqueous solvent substantially free of hydrolyzing agents for said arabinogalactan under the extraction conditions at a temperature of from just above the freezing point of said solvent to about 160° F., and compressing the resulting mixture to express an aqueous arabinogalactan extract from the wood.

12. A process as set forth in claim 11 wherein the aqueous solvent combined with the ground wood is substantially free of a material which will hydrolyze the arabinogalactan at the conditions of combining and compressing.

13. A process as set forth in claim 11 wherein the aqueous solvent combined with the wood contains a minor proportion of an organic acid selected from the group consisting of acetic acid and formic acid.

14. A process for recovering arabinogalactan from larch wood, which comprises mixing said wood in finely ground form with more than 35% water, DWS basis, substantially free of hydrolyzing agents for said arabinogalactan under the extraction conditions at a temperature of from just above the freezing point of said water to about 160° F., and compressing the resulting mixture to express an aqueous arabinogalactan extract from the wood, mixing said extract with additional fresh finely ground larch wood, and compressing this latter mixture to express a second aqueous extract of substantially higher arabinogalactan content.

15. A process for recovering arabinogalactan from larch wood, which comprises uniformly mixing said wood of a particle size through about 10 mesh with water substantially free of hydrolyzing agents for said arabinogalactan under the extraction conditions at a temperature of from just above the freezing point of said water to about 160° F. in amount exceeding 35% DWS basis, and up to about the saturation point of said wood, and so compressing the resulting mixture as to express an aqueous arabinogalactan extract from the wood.

16. A process for recovering arabinogalactan of high purity from larch wood, which comprises uniformly mixing said wood, of a particle size such that a major portion passes through 20 mesh screen, with more than about 35% liquid water, DWS basis, substantially free of hydrolyzing agents for said arabinogalactan under the extraction conditions at a temperature of from just above the freezing point of said liquid water to about 160° F., so compressing the resulting mixture as to express a major portion of the aqueous phase from the system, and collecting the said aqueous phase.

17. A process for recovering arabinogalactan of high purity from larch wood, which comprises uniformly mixing said wood of a particle size through about 20 mesh with water at a temperature up to about 85° F. in amount sufficient to at least substantially saturate the wood, then compressing the mixture under sufficient pressure to express at least about 60% of the water and dissolved arabinogalactan from the system and collecting the expressed aqueous extract, said water being substantially free of hydrolyzing agents for said arabinogalactan under the extraction conditions.

References Cited

UNITED STATES PATENTS 2,073,616   3/1937   Acree _____ 260—209

OTHER REFERENCES

Wise et al.: "Industrial and Engineering Chem.," vol 24, No. 4, April 1930.

Bouveng et al.: "Chem. Abst.," vol. 52, 1958, pages 12771(h)–12772(a).

LEWIS GOTTS, *Primary Examiner.*

ELBERT L. ROBERTS, *Examiner.*

JOHNNIE R. BROWN, *Assistant Examiner.*